United States Patent [19]
Kaplan

[11] Patent Number: 5,884,193
[45] Date of Patent: Mar. 16, 1999

[54] SYSTEM AND METHOD FOR CALL RESTRICTION IN A WIRELESS COMMUNICATION DEVICE

[75] Inventor: Diego Kaplan, San Diego, Calif.

[73] Assignee: Qualcomm Incorporated, San Diego, Calif.

[21] Appl. No.: 792,421

[22] Filed: Feb. 3, 1997

[51] Int. Cl.[6] .................................................... H04Q 0/00
[52] U.S. Cl. ........................................ 455/565; 379/88.23
[58] Field of Search ................................ 379/88.23, 88.25, 379/93.02, 196, 197, 201, 207, 230; 455/8, 9, 17, 462, 411, 550, 565

[56] References Cited

U.S. PATENT DOCUMENTS

| | | | |
|---|---|---|---|
| 4,658,096 | 4/1987 | West, Jr. et al. | 379/59 |
| 4,737,975 | 4/1988 | Shafer | 379/58 |
| 4,775,997 | 10/1988 | West, Jr. et al. | 379/58 |
| 4,922,517 | 5/1990 | West, Jr. et al. | 379/58 |

*Primary Examiner*—William Cumming
*Attorney, Agent, or Firm*—Russell B. Miller; Charles D. Brown; Roger W. Martin

[57] ABSTRACT

A keypad is operated by the user to generate keypad data indicative of a destination telephone number. A storage area stores data related to the calling plan and containing data indicative of call restrictions that may apply to the destination telephone number. A call restriction storage area is used to store user-selectable call restriction data. A processor accepts and uses keypad data to access the data storage area. The processor compares data indicative of call restrictions that may apply to the destination telephone number with the user-selectable call restriction data to determine if any user-selectable call restrictions apply to the destination telephone number. The processor sets an enable signal to an enabled state if no call restrictions apply to the destination telephone number and sets the enable signal to a disabled state if call restrictions do apply to the destination telephone number.

12 Claims, 6 Drawing Sheets

| 308 | 310 | 312 |
|---|---|---|
| 1 | 00000001 | NO DOMESTIC LONG DISTANCE |
| 2 | 00000010 | NO INT'L LONG DISTANCE |
| 3 | 00000100 | NO SPECIAL SERVICES |
| 4 | 00001000 | NO SPECIAL FEATURES |
| 5 | 00010000 | NO LOCAL CALLS |
| 6 | 00100000 | COUNTRY SPECIFIC |
| 7 | 01000000 | COUNTRY SPECIFIC |
| 8 | 10000000 | COUNTRY SPECIFIC |

FIG. 4A

| RESTRICTION LEVEL | RESTRICTION LEVEL STORAGE DATA | RESTRICTION COMBINATION |
|---|---|---|
| 0 | 00H | NONE |
| 1 | 02H | 2 |
| 2 | 03H | 1+2 |
| 3 | 07H | 1+2+3 |
| 4 | | |

SYSTEM AND METHOD FOR CALL RESTRICTION IN A WIRELESS COMMUNICATION DEVICE

BACKGROUND OF THE INVENTION

I. Field of the Invention

The present invention is related generally to a wireless communication device and, more specifically, to a system and method for call restriction within a wireless communication device.

II. Description of the Related Art

Wireless communication devices, such as cellular telephones, are widely used as a replacement for conventional telephone systems. In countries such as the United States, an extensive infrastructure already exists for conventional telephone systems. In lesser developed countries where the conventional telephone infrastructure is minimal or non-existent, wireless communications technology offers the possibility of an extensive communication system without the need for an extensive corresponding infrastructure. Wireless communication devices offer the convenience of portable communication from almost any location in the world. With a wireless communication device, a party can place local, long distance, or international telephone calls without the need for physical connection between the wireless communication device and a central switching office, such as a public switched telephone network.

Each country has specific telephone number assignments and rules for dialing telephone numbers within that country. These pre-designated rules are referred to herein as dialing rules, or calling plans. For example, the United States uses seven digits to represent a local exchange and telephone number. To place a local call, a user must dial seven digits corresponding to the desired destination telephone number. To place a long distance call within the United States, the user must dial a 1, followed by the destination area code and telephone number. Thus, a long distance call in the United States is represented by eleven digits. To place an international long distance call, the user must dial 011 followed by a country code and telephone number. It can be seen that the telephone dialing rules for the United States require a predetermined sequence of digits for local calls, domestic long distance calls, and international long distance calls. It should be noted that other countries typically use a different set of dialing rules.

While a wireless communication device offers convenience in communication throughout the world, it is subject to misuse if the wireless communication device is lost, stolen, or is subjected to other forms of unauthorized use. Therefore, it can be appreciated that there is a significant need for a system and method for call restrictions that are implemented by the wireless communication device.

SUMMARY OF THE INVENTION

The present invention is embodied in a system and method to control transmissions from a wireless communication device to a central controller. The system uses a pre-designated calling plan and includes an enable signal having enabled and disabled states to selectively enable call origination from the wireless communication device to the central controller. A keypad is operated by the user to generate keypad data indicative of a destination telephone number. The system also includes a storage area storing data related to the calling plan and containing data indicative of call restrictions that may apply to the destination telephone number. A call restriction storage area is used to store user-selectable call restriction data. A processor accepts and uses keypad data to access the data storage area. The processor compares data indicative of call restrictions that may apply to the destination telephone number with the user-selectable call restriction data to determine if any user-selectable call restrictions apply to the destination telephone number. The processor sets the enable signal to the enabled state if no call restrictions apply to the destination telephone number and sets the enable signal to the disabled state if call restrictions do apply to the destination telephone number. In one embodiment, the enable signal may be a flag that is set if call restrictions do apply and cleared if no call restrictions apply.

The storage area can store data in the form of a state data table indicative of a present machine state of the wireless communication device. The present state of the device is altered in response to each entry of keypad data. The state data table also contains data indicative of call restrictions at the present state of the wireless communication device. The processor can compare the data indicative of call restrictions that may apply to the present state with the user-selectable call restriction data to determine if any user-selectable call restrictions apply to the present state of the wireless communication device. The processor sets the enable signal to the enabled state if no call restrictions apply to the present state of the device and sets the enable signal to the disabled state if any call restrictions apply to the present state.

The system may also include a password storage area to store a user password. The processor compares keypad data to the stored user password and permits access to the call restriction storage area to store user-selectable call restriction data only if the keypad data matches the user password.

The user-selectable call restriction data may be selected by setting data bits in a call restriction code word stored in the call restriction storage area. The processor compares the call restriction code word with the data indicative of call restrictions applicable to the present state of the wireless communication device by performing a logical AND operation of the call restriction code word with the data indicative of the call restrictions applicable to the present state of the wireless communication device.

In one embodiment, the system may also include an override number storage area to store data indicative of a user-selected telephone number. The processor allows the call to originate regardless of the state of the enable signal if the destination telephone number entered by the user matches the stored data in the override number storage area thus permitting wireless communication between the wireless communication device and a communication device corresponding to the user-entered destination telephone number. In an exemplary embodiment, one or more speed dial storage locations within the wireless communication device may be designated as the override number storage area.

The system may also include a restricted number storage area to store data indicative of a user selected telephone number. The processor never allows a call to originate regardless of the state of the enable signal if the destination telephone number entered by the user matches the stored data in the restricted data storage area thus preventing wireless communication between the wireless communication device and a communication device corresponding to the user-entered destination telephone number. In an exemplary embodiment, one or more speed dial storage locations in the wireless communication device may be designated as the restricted number storage area.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Wireless communication devices, such as cellular telephones, typically include a lock code that disables the device unless the appropriate password sequence is entered by a user. However, if the conventional wireless communication device is left unlocked, it can typically be used to communicate locally, nationally, or internationally. The present invention advantageously provides various levels of call restriction that can be selected by the user and implemented within the wireless communication device itself.

Figure 1:
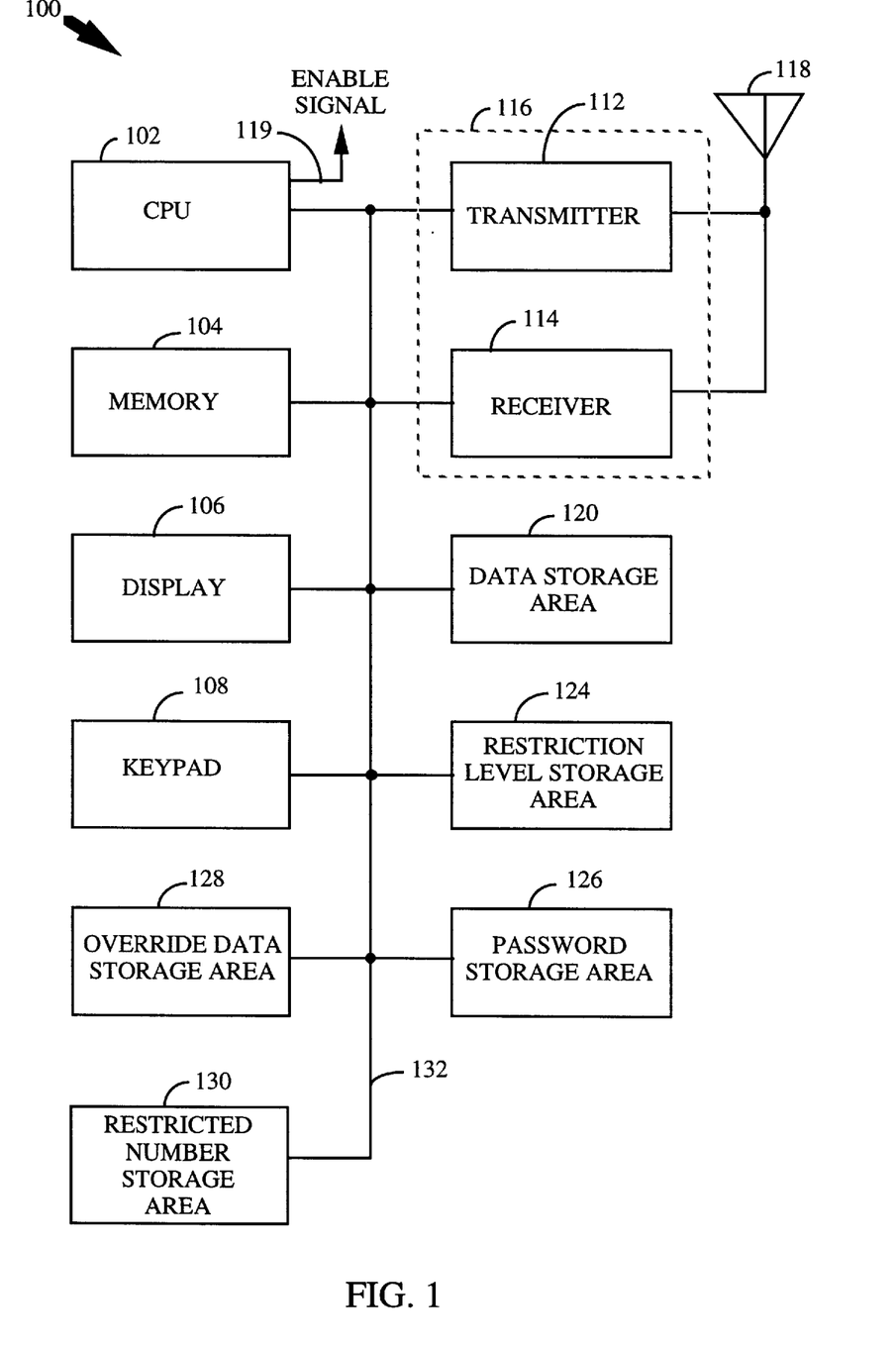
FIG. 1 is a functional block diagram of a wireless communications device designed in accordance with the principles of the present invention.

The present invention is embodied in a system 100, illustrated in the functional block diagram of FIG. 1. The system 100 can be readily implemented by any wireless communication device, such as a cellular telephone, personal communication system (PCS) device, wireless local loop (WLL) telephone, or the like. However, for the sake of clarity, the following paragraphs describe an implementation of the system 100 within a cellular telephone. The system 100 advantageously processes call restrictions within the wireless communication device itself rather than rely on call restriction processing at a cell site controller (not shown).

The system 100 includes a CPU 102 and a memory 104, which may include both read-only memory and random access memory. The system 100 may optionally include a display 106 such as a liquid-crystal display. However, the system 100 may be implemented in a cellular telephone or other wireless communication device that has no display. The system 100 also includes a keypad 108.

A transmitter 112 and receiver 114 allow transmission and reception of data, such as audio communications, between the system 100 and a remote location, such as a cell site controller (not shown). The transmitter 112 and receiver 114 may be combined into a transceiver 116. An antenna 118 couples radio frequency signals between the system 100 and the cell site controller. The antenna 118 is coupled to the transceiver 116. An enable signal 119 from the CPU 102 is shown in FIG. 1. However, the enable signal 119 can be a location within the memory 104 or simply be a data bit within the CPU 102, such as a flag, rather than a separate external signal from the CPU.

As is well known to those of ordinary skill in the art, wireless communication devices, such as cellular telephones, transmit a call origination message from the transmitter 112 to the cell site controller (not shown). At the end of the dialing process, the call origination message is transmitted in accordance with an industry standard format. In the preferred embodiment, the CPU generates the call origination message in response to user input at keypad 108. The system 100 analyzes the digits entered by the user and sets the enable signal 119 to an enabled state or a disabled state depending on whether or not call restrictions apply to the destination telephone number. If the enable signal 119 is in the disabled state, the CPU 102 prevents the transmission of the call origination message thus effectively preventing the system 100 from originating calls in violation of call restrictions.

In a preferred embodiment, the enable signal 119 is a flag bit within an internal register (not shown) of the CPU 102. The flag bit is TRUE (i.e., set to a logic 1) if the system 100 detects a call restriction. Conversely, the flag bit that forms the enable signal 119 is FALSE (i.e., set to a logic 0) if no call restrictions current exist in the system 100. Other well-known techniques such as storing the enable signal 119 in the memory 104 can also be used by the system 100. The present invention is not limited by the specific technique used to indicate the presence or absence of call restrictions.

Also included in the system 100 is a data storage area 120 which contains data related to one or more calling plans for different countries. As will be described in detail below, the data storage area 120 may be considered a state table containing data indicative of all relevant dialing states of the system 100. In addition, the data storage area 120 contains data indicative of call restrictions that may apply to the present dialing state of the system 100. The data storage area 120 may be part of the memory 104 or a separate storage device, such as a programmable read-only memory.

A restriction level storage area 124 stores data corresponding to the defined calling restrictions. The restriction level storage area 124 may also be part of the memory 104 or a separate data storage area. As will be described in greater detail below, the CPU 102 compares the user selected calling restrictions with the data indicative of call restrictions that may apply to the present state of the system 100. Thus, the data in the restriction level storage area 124 is compared with the call restriction data for the present state of the system 100 as indicated by data within the data storage area 120. In one embodiment, the user may select each type of call restriction that he wishes to place on the system 100. This is particularly advantageous when the system 100 includes the display 106. In other embodiments, the service provider can combine various types of call restrictions and permit the user to select one restriction level that combines the call restrictions selected by the service provider. This embodiment may be advantageously implemented when the system 100 does not include the display 106, or for simplicity in programming restriction levels.

Access to the restriction level storage area 124 may be controlled by a password. The system 100 includes a password storage area 126 that stores a user-selected password. The password storage area 126 may be part of the memory 104 or a separate storage area. The password within the password storage area 126 may be the call-lock password used in the conventional cellular telephone or a separate password selected solely for the purpose of implementing or altering call restrictions.

The system 100 selectively enables the transmission of a call origination message if no calling restrictions apply to the present state of the system and disables the transmission of a call origination message if any restrictions apply to the present state of the system. The system 100 also includes override capabilities to enable the transmission of a call origination message despite calling restrictions that may apply to the present state of the system. To permit the override feature, the system 100 includes an override data storage area 128 containing one or more user selected destination telephone numbers. The override data storage area 128 may be part of the memory 104 or a separate storage area. In an exemplary embodiment, the wireless communication storage device 100 includes a plurality of speed dialing storage locations. Selected ones of the speed dialing storage locations are designated as the override data storage area 128. If the destination telephone number entered by the user via the keypad 108 matches one of the destination telephone numbers in the override data storage area 128, the CPU 102 will selectively enable the transmission of the call origination message by the transmitter 112 despite any calling restrictions that may apply to the present state of the system.

The system 100 also includes a restricted number storage area 130 to store user-selectable destination telephone numbers that are restricted. The restricted number storage area 130 may be part of the memory 104 or a separate storage location. In an exemplary embodiment, a predetermined number of speed dialing storage locations are designated as the restricted number storage area 130. The CPU 102 will selectively disable the transmission of the call origination message by the transmitter 112 if the destination telephone number entered by the user via the keypad 108 matches one of the destination telephone numbers in the restricted number storage area 130 even if no calling restrictions would otherwise apply to the present state of the system. The various components of the system 100 are coupled together by a bus system 132, which may carry power, control signals, and status signals in addition to data.

Figure 2:
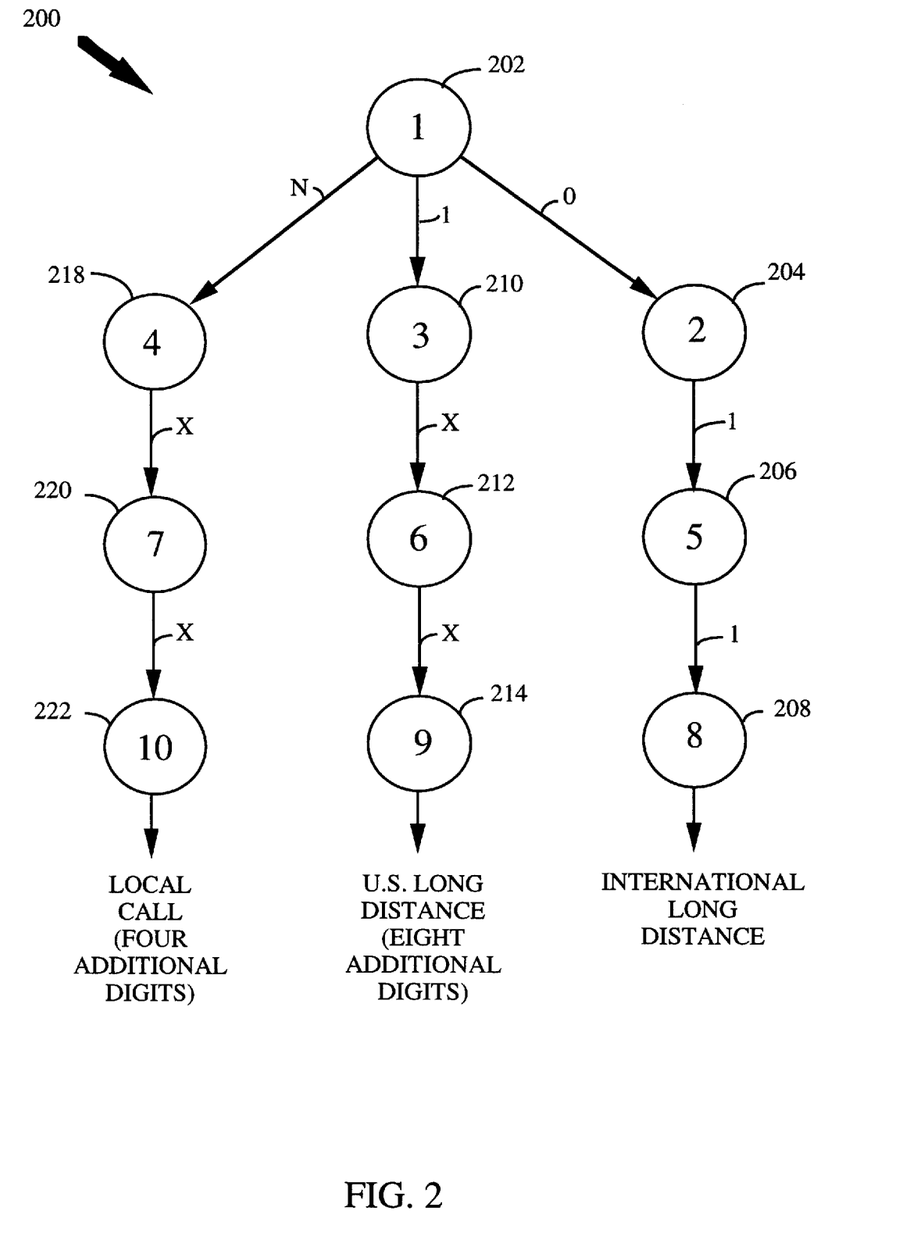
FIG. 2 illustrates selected portions of an exemplary state diagram implementing dialing rules for the United States.

The user controls communication between the system 100 and a central controller, such as a cell site controller, using the keypad 108. As each keystroke is entered by the user, the system 100 enters a machine state, illustrated by a state diagram 200 shown in FIG. 2. The system 100 begins at an initial state, State 1, indicated by the reference numeral 202 prior to the user entering any digits on the keypad 108. The first digit entered by the user on the keypad 108 causes the system 100 to change from State 1 202 to a different state depending on the value of the digit entered on the keypad. If the user enters a 0 on the keypad 108, the system 100 changes to a State 2, indicated by the reference numeral 204. From State 2 204, the user enters additional digits that cause the system 100 to change states as each digit is entered on the keypad 108. As illustrated in FIG. 2, if the user enters a 1, the system 100 changes from State 2 204 to a State 5, indicated by the reference numeral 206. If the user enters an additional 1 while in State 5 206, the system 100 changes to a State 8, indicated by the reference numeral 208 that indicates the user's intention to place an international long-distance call by entering the sequence (0+1+1). As can be appreciated by those of ordinary skill in the art, a user will enter additional digits indicative of a country code, city code, telephone number, and the like. The specific sequence of digits entered by the user depend on the destination telephone number. Details of this sequence need not be described herein.

From State 1 202, the user can enter a 1 on the keypad 108 causing the system 100 to change to a State 3, indicated by the reference numeral 210. The entry of any subsequent digit X, with X being in the range 0 to through 9, causes the system 100 to change from State 3 210 to a State 6, indicated by the reference numeral 212. The entry of any subsequent digit 0 through 9, indicated by the reference X, causes the system 100 to change from State 6 212 to a State 9, indicated by the reference numeral 214. The entry of additional digits from State 9 214 would be indicative of a U.S. long-distance call. As those of ordinary skill in the art can appreciate, the entry of 8 additional digits is required to complete a U.S. long-distance call if the system is at State 9 214 so that the sequence of all digits entered is of the form (1+ area code+ telephone number).

From State 1 202, the entry of any digit N (i.e., 2–9) causes the system to change to a State 4, indicated by the reference numeral 218. The subsequent entry of any digit X (i.e. 0–9) causes the system 100 to change from State 4 218 to a State 7, indicated by the reference numeral 220. As illustrated in FIG. 2, the entry of additional digits is indicative of a local call. As can be appreciated by those of ordinary skill in the art, a total of 7 digits, beginning with the digit N, is indicative of a local call. Thus, each entry on the keypad 108 causes the system 100 to change states. At each state of the state diagram 200 one or more restrictions may apply. For example, the user may restrict the use of the system 100 only to local calls. In that event, the entry of digits corresponding to U.S. and international long-distance calls will result in call restrictions. In an exemplary embodiment, the system 100 determines the restrictions at each state of the state diagram 200.

It should be noted that the state diagram of FIG. 2 is merely portion of an exemplary calling plan applicable to the United States. However, the present invention is not limited to the United States calling plan and may be programmed by one skilled in the art, as indicated below, to customize the state diagram to any calling plan of any country. Furthermore, it should be noted that for simplicity, many states and branches are not illustrated. For example, special services such as local information (411) and local emergency (911) are not illustrated as separate states, nor are operator assisted calls that begin with "0" although a designer implementing the present invention may choose to treat these special services differently. Additionally, for simplicity, invalid call dialing states are not shown.

Figure 3:
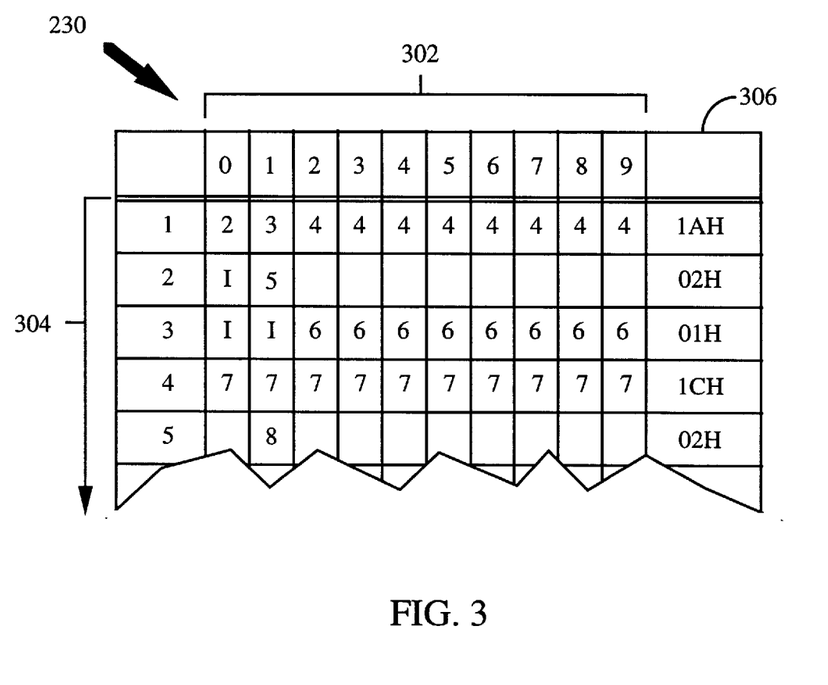
FIG. 3 is a portion of a data table for the state diagram of FIG. 2 illustrating the storage of data relating to dialing rules and call restrictions.

The state diagram 200 is readily stored in the data storage area 120 in the form of a data table 230 illustrated in FIG. 3. While shown in FIG. 3 as the data table 230, those of ordinary skill in the art will recognize that any suitable data structure may be used to store the data corresponding to the state diagram 200. The present invention is not limited by the specific form of data structure used to store data corresponding to the state diagram 200.

Each state of the state diagram 200 is used as an index to the data table 230. At each state corresponding to row index 304, the user may enter a digit X (i.e., 0 through 9) which corresponds to column index 302. The entry of a digit points to a specific location in the data table 230 that indicates the next state of the system 100. In addition, the data table 230 contains, in column 306, data indicative of call restrictions that are applicable to that particular state. As will be described in detail below, the data table 230 includes one byte of call restriction data in column 306 for each state of the system 100. The call restriction data byte in the data table 230 indicates the type of call restrictions that are applicable to the present machine state. For example, if the user has entered the digits 01, placing the system 100 in State 5 206, only restrictions related to international long distance calls may be applicable, corresponding to the hexadecimal symbol 02H in column 306. Similarly, if the user has entered the digits NXX (where N represents any digit from 2 to 9 and X represents any digit from 0 to 9) placing the system 100 in State 10 222, restrictions on domestic and international long distance calls will not apply. However, restrictions related to local calls and restrictions related to special services or special features may still be applicable to the present machine state. Thus, the restriction data byte in column 306 in the data table 230 provides an indication of types of restrictions that may be applicable to the present machine state.

It should be noted that the state diagram 200 in FIG. 2 and the data table 230 in FIG. 3 do not illustrate each possible state of the system 100. The number of possible machine states is dependent on the specific calling plan implemented in the country in which the system 100 is operated. For the sake of brevity, only a limited number of machine states are illustrated in FIGS. 2 and 3. In addition, it is possible to enter data entries on the keypad 108 (see FIG. 1) that result in inoperable or illegal machine states. For example, if the system 100 is in State 3, illustrated in FIG. 2 by the reference 210, the entry of a 0 or 1 on the keypad results in an illegal machine state. Therefore, the data entries illustrated in the data table 230 indicate that the system 100 is in an illegal state and the present call attempt is terminated, with an appropriate alert displayed on display 106, or an alert tone played through a speaker (not shown).

The system 100 may be advantageously programmed with a data table for different countries. For example, the data table 230, illustrated in FIG. 3, corresponds to the calling plan used in the United States. However, an additional data table 230' (not shown) may contain data related to the calling plan for a different country, such as India. For the sake of brevity, the state diagram 200 and data table 230 are described only briefly. However, those of ordinary skill in the art will recognize that the entry of additional digits will cause the system 100 to change machine states in accordance with the specific calling plan of the country. Details on the use of data tables to store calling plans are provided in copending U.S. patent application Ser. No. 08/608,924, filed on Feb. 29, 1996 now U.S. Pat. No. 5,812,651, entitled "TELEPHONE NUMBER PARSER FOR WIRELESS LOCAL LOOP TELEPHONES," which is incorporated herein by reference in its entirety.

Figure 4A:
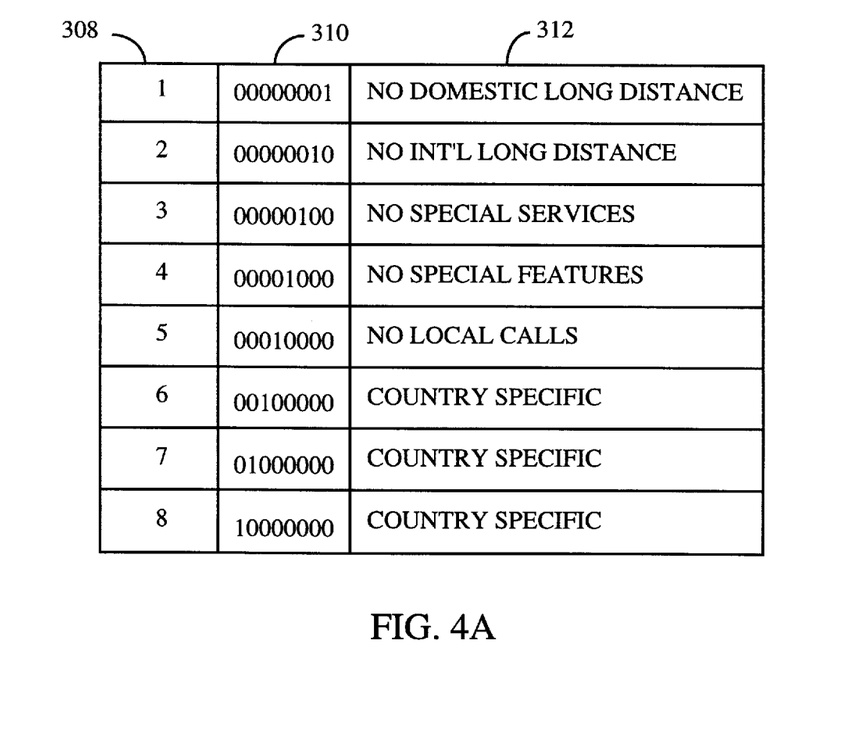
FIG. 4A is a table illustrating defined call restrictions.

A number of different call restrictions may be implemented by the system 100. FIG. 4A illustrates how the different restriction levels are defined. As illustrated in FIG. 4A, the restriction data in column 310 of the restriction level storage area 124 (see FIG. 1) contains one eight-bit byte of data, with each bit corresponding to a specific form of call restriction. In an exemplary embodiment, a data bit is set to a 1 to indicate a restriction of a particular service. For example, setting the least significant data bit (rightmost) to a logic 1 indicates domestic long distance calls are prohibited. Setting the next least significant data bit to a logic 1 indicates international long distance calls are prohibited. Special services, such as the use of 411 telephone numbers, can be prevented by setting the next least significant data bit to a logic 1. Special features, such as call waiting, call forwarding, speed dialing, and the like may be restricted by setting the next least significant data bit to a logic 1. Local calls may be restricted by setting the next least significant data bit to a logic 1. Other features that are specific to individual countries may be restricted by setting one of the remaining data bits to a logic 1. For example, in the U.S., the use of 800 numbers, 900 numbers, collect calls, and the like may be restricted using these remaining data bits. As can be appreciated, FIG. 4A illustrates a specific implementation of call restrictions. However, the system 100 is not limited to the specific call restrictions definition or bit pattern of the restriction data byte illustrated in FIG. 4A.

In the preferred embodiment, the specific call restriction definitions of FIG. 4A are determined by the service provider, with the user optionally able to select various combinations of them for use as described herein below. In an alternate embodiment, the user may himself define the restriction definitions of FIG. 4A. To set the specific call restriction definitions of FIG. 4A, the display may provide the user with guidance in restricting calls such as domestic long distance calls, international long distance calls, and the like using a step-through menu to guide the user in the selection of call restrictions. The call restriction data entered by the user would determine which byte in column 310 corresponds to which restriction definition in column 312. As previously described, the access to the restriction level storage area 124 would be controlled by a password stored in the password storage area 126. The different restriction definitions may be referred to by a restriction definition number listed in column 308. Thus, restriction definition number 1 would correspond to No Domestic Long Distance, and so on.

Figure 4B:
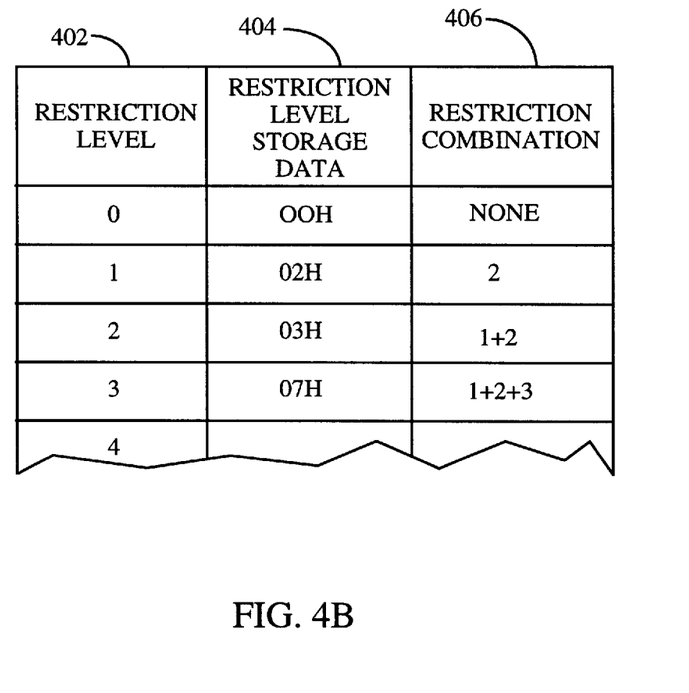
FIG. 4B illustrates the combination of various defined call restrictions of FIG. 4A into groups to permit user-selectable levels of call restriction.

The restriction definitions shown in FIG. 4A, once defined, may be combined and arranged to form a restriction level table as shown in FIG. 4B. These combinations may be configured by the user, or the service provider may preselect various combinations of call restrictions and permit the user to select a single combination. For example, the user may select one of ten levels of restriction indexed by column 402, corresponding to digits 0–9 on the keypad 108 (see FIG. 1), which provide various combinations of call restrictions. The table of FIG. 4B illustrates the use of ten possible combinations of restrictions. In FIG. 4B, the user may select restriction level 0 corresponding to no restrictions. Alternatively, the user may select restriction level 1, which corresponds to restriction definition number 2 in column 406, and prohibits only international long distance calls. Restriction level 2 corresponds to restriction definition numbers 1 and 2 in column 406, and thus prohibits domestic and international long distance calls. Restriction level 3 corresponds to restriction definition numbers 1, 2, and 3 in column 406, and thus restricts the use of special services in addition to restrictions on domestic and international long distance calls. As can be appreciated, FIG. 4B illustrates an exemplary embodiment of call restriction levels. The system 100 is not limited to the specific combinations of call restrictions illustrated in FIG. 4B.

The restriction level storage area 124 stores a data byte represented by column 404 corresponding to the specific restriction levels selected by the user. The data in the table of FIG. 4B corresponds to the individual restriction number definitions in FIG. 4A. For example, restriction level 2, which restricts domestic and international long distance calls, corresponds to the two least significant data bits to logic 1s in the table of FIG. 4A. In this example, the restriction level storage area 124 (see FIG. 1) stores a 03h where "h" indicates the use of hexadecimal data. Thus, the restriction level storage area 124 contains one byte of data corresponding to various calling restrictions. The calling restrictions may be entered individually using, for example, the table of FIG. 4A, or in combinations using the level restrictions illustrated, for example, in FIG. 4B.

The CPU 102 (see FIG. 1) determines whether call restrictions are applicable at each machine state by performing a logical AND operation with the restriction data byte from column 306 of the data table 230 with the data byte stored in column 404 of the restriction level storage area 124. For example, if restriction level 1 has been selected by the user, international long distance calls are restricted by the system 100. The restriction level storage area 124 stores the value 02h to indicate this restriction. If the user entered the sequence of digits 01, the system 100 would be placed in State 5 206 (see FIG. 2). The State 5 206 could potentially be an international long distance call. Therefore, the restriction data byte in the data table 230 (see FIG. 3) for State 5 contains a 02h to indicate international long distance restriction could potentially apply to this machine state. The CPU 102 performs logical AND operation of the restriction data 02h from column 306 of the data table 230 with the data in column 404 the restriction level storage area 124. In the present example, the restriction level storage area 124 contains the value 02h indicating user-selected restriction of international long distance calls. Therefore, the result of the logical AND operation is a 02h.

A non-zero result of the logical AND operation indicates that some type of call restrictions apply to the present machine state of the system 100. In an exemplary embodiment, the system 100 performs the logical AND operation at each machine state as the user enters a digit on the keypad 108. When the system 100 reaches a final machine state, such as the completion of digit entry for an international long distance call, the system 100 can readily determine whether any call restrictions still apply to the present machine state. If any call restrictions apply to the present machine state, the system 100 will not process the call request. In the example presented above, international long distance calls are restricted by the system 100. Therefore, user entry of digits on the keypad 108 corresponding to an international long distance call will result in a machine state in which the corresponding restriction data byte will result in a non-zero value when a logical AND operation is performed with the data in the restriction level storage area 124. Therefore, international long distance calls will be restricted. Similar results will occur with other types of restrictions. For example, the entry of digits corresponding to a U.S. long distance call will result in a call restriction if the restriction level storage area 124 contains a logic 1 in the bit corresponding to restricted domestic long distance calls.

In an exemplary embodiment, the CPU 102 (see FIG. 2) sets a restriction flag, i.e. disables the enable signal 119, if there is a non-zero result of the logical AND operation. The restriction flag indicates that restrictions apply to the present machine state of the system 100. As previously discussed, the system 100 will process the call origination message if the restriction flag is not set (i.e., Restriction Flag=FALSE) and will not process the call origination message if the restriction flag is set (i.e., Restriction Flag=TRUE). In addition, the system 100 may generate an error message on the display 106, or generate an audible tone to indicate that the call will not be processed. In a cellular telephone, the user depresses a SEND button (not shown) on the keypad 108 to transmit the desired digits to the cell site controller (not shown). If the restriction flag is not set, the CPU will enable the transmitter 112 to transmit the call origination message. If the restriction flag is set, the CPU 102 will cause the cellular telephone to hang up thus terminating the call. Alternatively, if the system 100 is implemented as a portion of a wireless local loop telephone, the user may not be required to press the SEND button in order to initiate a call origination.

While the system 100 implements call restrictions as described above, an additional embodiment may be used to override the call restriction features described above. For example, the user may wish to restrict domestic and international long distance calls except for one particular long distance number. The CPU 102 determines whether the digits entered by the user correspond to a destination telephone number stored in the override data storage area 128. If the user entered digits correspond to any destination telephone number stored in the override data storage area 128, the system 100 processes the call regardless of the state of the restriction flag. Thus, the system 100 provides restriction override capabilities. In addition, the system 100 may be programmed to override call restrictions for certain other telephone numbers, such as emergency numbers (e.g., 911), service provider telephone numbers, and the like.

Many cellular telephones include speed dialing numbers. In an exemplary embodiment, the system 100 uses several pre-designated speed dialing numbers as the override data storage area 128. In one embodiment, the system 100 provides storage in the memory 104 (see FIG. 1) for 30 speed dialing numbers. Speed dialing numbers 21–25 are designated for use as the override data storage area 128. Access to the override data storage area 128 is restricted by the password in the password storage area 126. The user must enter the appropriate password using the keypad 108 to gain access to speed dial locations 21–25. Upon successful entry of the password, the user may enter one or more predetermined destination telephone numbers in the speed dialing storage areas 21–25.

When the system 100 is in a final machine state, such as when the user depresses the SEND button (not shown), or in the case of a WLL telephone, when the dialing timer times out, the CPU determines whether call restrictions still apply to the present machine state in the manner described above. If call restrictions do apply to the present machine state, the CPU 102 compares the destination telephone number entered by the user with the telephone numbers pre-stored in the speed dialing locations 21–25. If the destination telephone number matches one of the pre-designated telephone numbers in the speed dialing locations 21–25, the CPU 102 will clear the restriction flag and process the telephone call.

In addition to data in the override data storage area 128, the system includes one or more user specified restricted telephone numbers stored in the restricted number storage area 130. Prior to placing a call, the CPU 102 compares the digits entered by the user via the keypad 108 with telephone numbers stored in the restricted number storage area 130. If the user entered digits match any of the destination telephone numbers in the restricted number storage area 130, the CPU will not permit the call to be processed. In that event, the CPU will generate an error message or error tone and terminate the call.

In an exemplary embodiment, the system uses additional speed dialing locations in the memory 104 (see FIG. 1) as the restricted number storage area 130. In one embodiment, speed dialing locations 26–30 are designated as the restricted number storage area 130. Access to the restricted number storage area 130 is controlled by the password as described above. When the system 100 is in a final machine state, such as when the user depresses the SEND button (not shown), or in the case of a WLL telephone when the dialing timer times out, the CPU 102 determines whether call restrictions apply to the present machine state. If call restrictions do not apply, the CPU 102 compares the digits entered by the user with the telephone numbers stored in the speed dialing locations 26–30. If the user entered telephone number matches one of the predetermined telephone numbers in the speed dialing locations 26–30, the CPU 102 will set the restriction flag and will not process the call. Thus, the system 100 provides data locations for override of the call restrictions to process calls to predetermined destination telephone numbers and to prohibit calls to certain predetermined destination telephone numbers.

Figure 5A:
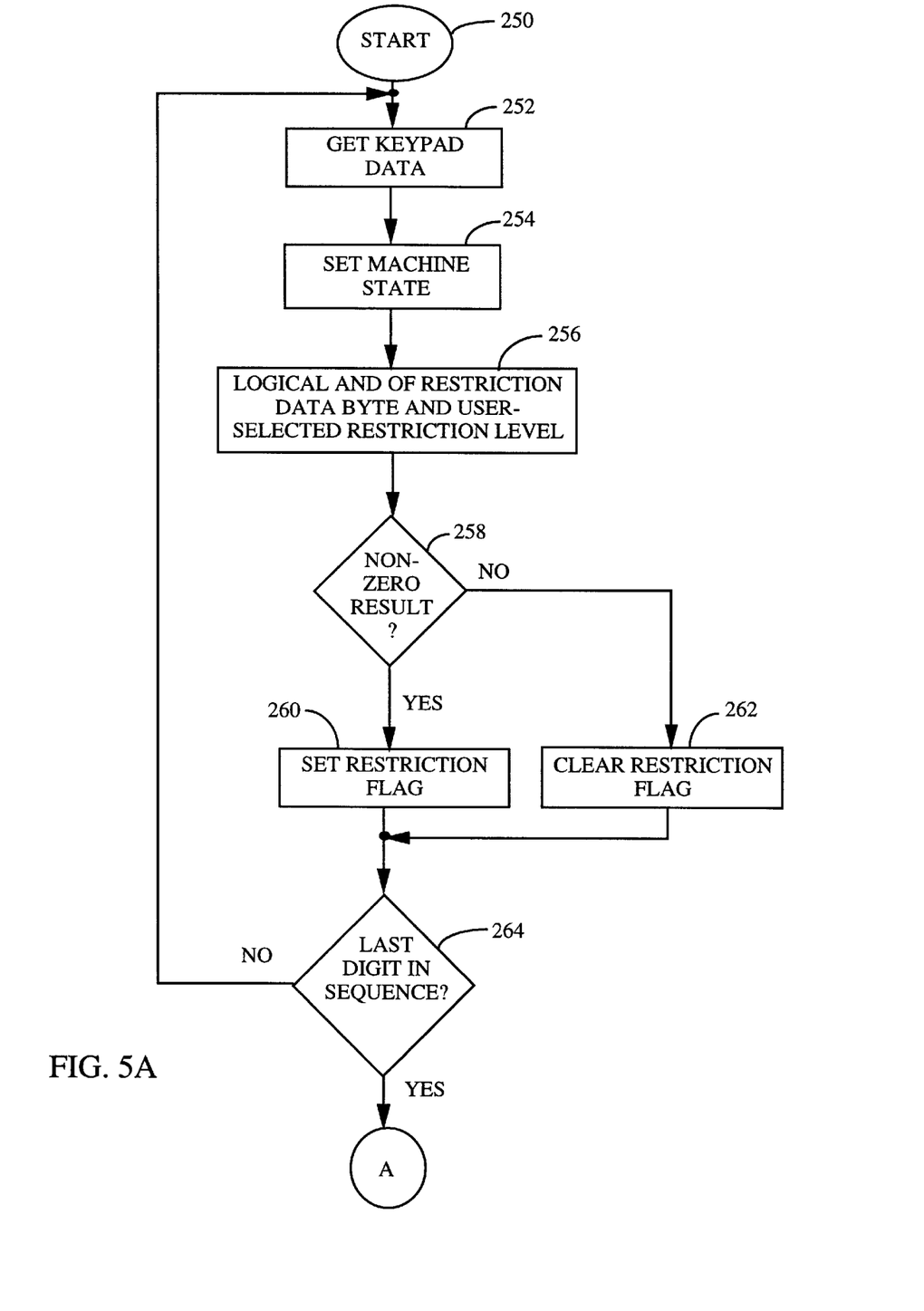
FIGS. 5A and 5B together form a flowchart illustrating the operation of the wireless communications device of FIG. 1.
Figure 5B:
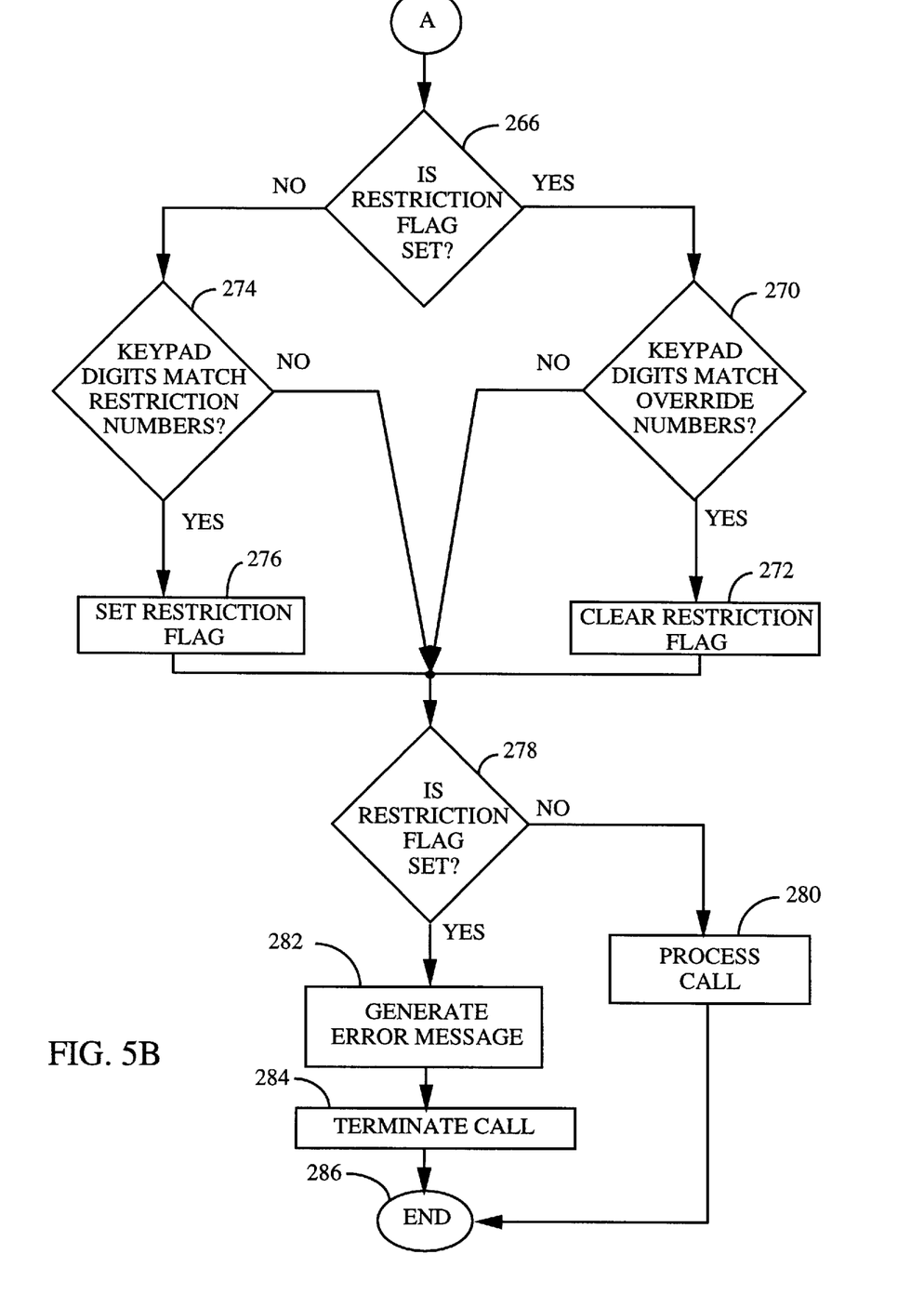

A flowchart of the operation of the system 100 is illustrated in FIGS. 5A and 5B. At a start 250, the system 100 is in State 1 202 (see FIG. 2). In step 252, the system 100 receives keypad data from the keypad 108 in response to the user entry of a digit. Based on the user entered digit, the system 100 enters a new machine state in step 254. In step 256, the CPU 102 (see FIG. 1) performs a logical AND of the restriction data byte in the current machine state and the user selected restriction level represented by data in the restriction level storage area 124.

In decision 258, the CPU 100 determines whether the result of the logical AND operation is a non-zero result. If the logical AND operation provides a non-zero result, the result of decision 258 is YES and the CPU 102 sets the restriction flag in step 260. If the logical AND operation provided a zero result, the result of decision 258 is NO and the CPU 102 clears the restriction flag in step 262.

Upon setting the restriction flag in step 260 or clearing the restriction flag in step 262, the system 100 moves to decision 264 to determine whether the digit entered by the user on the keypad 108 is the final digit in the sequence. If the digit was not the final digit in the sequence, the result of decision 264 is NO. In that event, the system 100 returns to step 252 to retrieve additional keypad data from the keypad 108. If the digit is the last digit in the sequence, the result of decision 264 is YES. In that event, the system 100 moves to decision 266, shown in FIG. 5B, to determine whether the restriction flag is set.

If the restriction flag is set, the result of decision 266 is YES. In that event, the system 100 moves to decision 270 to determine whether the digits entered on the keypad match one of the override telephone numbers in the override data storage area 128 (see FIG. 1). If the user entered digits match one of the override numbers, the result of decision 270 is YES and the CPU 102 clears the restriction flag in step 272. If the keypad digits do not match one of the override numbers, the result of decision 270 is NO and the restriction flag remains set.

If the restriction flag is not set, the result of decision 266 is NO. In that event, the system 100 moves to decision 274 to determine whether the keypad digits match a restricted number in the restricted number storage area 130 (see FIG. 1). If the keypad digits match one of the restricted numbers, the result of decision 274 is YES. In that event, the CPU 102 sets the restriction flag in step 276. If the keypad digits do not match a restricted number, the result of decision 274 is NO and the restriction flag remains cleared.

Following a NO result in decision 270 or decision 274, or after clearing the restriction flag in step 272 or setting the restriction flag in step 276, the system 100 moves to decision 278 to determine whether the restriction flag has been set by the CPU 102. It should be noted that the restriction flag may be set by the CPU in step 260 (see FIG. 5A) as a result of call restrictions or set by the CPU in step 276 because the number entered by the user matches a number in the restricted number storage area 130 (see FIG. 1). If the restriction flag is not set, the result of decision 278 is NO, and the system processes the call in step 280 and ends the analysis at 286. If the restriction flag is set, the result of decision 278 is YES. In that event, the system generates an error message in step 282, terminates the call in step 284, and ends the analysis at 286.

Thus, the system 100 advantageously allows multiple types of call restrictions that are analyzed at each machine state by the wireless communications device itself rather than relying on time consuming data analysis performed by the cell site controller. In addition to the levels of call restriction described above, the system 100 provides for overrides for certain telephone numbers that will always be processed and restrictions for certain telephone numbers that will never be processed.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I (We) claim:

1. A system for controlling communications between a wireless communication device and a central controller having a calling plan, the system comprising:

a transmitter for transmitting data from said wireless communication device to said central controller;

an enable signal having enabled and disabled states for selectively enabling transmission of a call origination message from said wireless communication device to said central controller;

a keypad operable by a user for generating keypad data;

a storage area for storing a state table indicative of a present state of the wireless communication device, said present state being altered in response to each entry of keypad data, said state table further for storing data indicative of call restrictions applicable to said present state;

a call restriction storage area for storing call restriction data; and a processor for comparing said data indicative of call restrictions applicable to said present state to said restriction data and for generating said enable signal in response to said comparison.

2. The system of claim 1 wherein said processor sets said enable signal to said disabled state if call restrictions apply to said present state and wherein said processor sets said enable signal to said enabled state if call restrictions do not apply to said present state.

3. The system of claim 1, further including a password storage area for storing a user password, said processor further for comparing said keypad data to said user password and permitting access to said call restriction storage area to store said call restriction data if said keypad data matches said user password.

4. The system of claim 2, further including an override number storage area for storing data indicative of a override telephone number, said processor further for setting said enable signal to said enabled state regardless of whether call restrictions apply to said present state if said keypad data matches said override telephone number.

5. The system of claim 2, further including a restricted number storage area for storing data indicative of a restricted telephone number, said processor further for setting said enable signal to said disabled state regardless of whether call restrictions apply to said present state if said keypad data matches said restricted telephone number.

6. The system of claim 1 wherein said enable signal is a logical flag.

7. A method for controlling communications between a wireless communication device and a central controller having a calling plan, the method comprising the steps of:

generating keypad data in response to keypad entries;

storing a state table indicative of a present state of said wireless communication device, said present state being altered in response to each entry of keypad data;

storing data indicative of call restrictions applicable to said present state;

storing call restriction data;

comparing said data indicative of call restrictions applicable to said present state to said restriction data; and generating said enable signal in response to said comparison.

8. The method of claim 7 further comprising the steps of:

setting said enable signal to a disabled state if call restrictions apply to said present state; and setting said enable signal to an enabled state if call restrictions do not apply to said present state.

9. The method of claim 7, further comprising the steps of:

storing a user password;

comparing said keypad data to said user password; and permitting access to said call restriction storage area if said keypad data matches said user password.

10. The method of claim 8, further comprising the steps of:

storing data indicative of a override telephone number; and setting said enable signal to said enabled state regardless of whether call restrictions apply to said present state if said keypad data matches said override telephone number.

11. The method of claim 8, further comprising the steps of:

storing data indicative of a restricted telephone number; and setting said enable signal to said disabled state regardless of whether call restrictions apply to said present state if said keypad data matches said restricted telephone number.

12. The method of claim 7 wherein said enable signal is a logical flag.

* * * * *